(12) United States Patent
Memory

(10) Patent No.: US 7,640,876 B2
(45) Date of Patent: Jan. 5, 2010

(54) BIN LEVEL SENSOR FOR USE WITH A PRODUCT DISPENSING AGRICULTURAL IMPLEMENT

(75) Inventor: Russell J. Memory, Saskatoon (CA)

(73) Assignee: CNH Canada, Ltd., Saskatoon, SK (CA)

( * ) Notice: Subject to any disclaimer, the term of this patent is extended or adjusted under 35 U.S.C. 154(b) by 136 days.

(21) Appl. No.: 11/949,543

(22) Filed: Dec. 3, 2007

(65) Prior Publication Data
US 2009/0139436 A1  Jun. 4, 2009

(51) Int. Cl.
A01C 7/00 (2006.01)
A01C 9/00 (2006.01)
A01C 15/00 (2006.01)
B67D 5/08 (2006.01)
B67D 5/14 (2006.01)

(52) U.S. Cl. .................. 111/170; 111/200; 111/904; 222/64; 340/684

(58) Field of Classification Search .................. 111/130, 111/200, 900, 903, 904, 925, 170; 340/500, 340/603, 612, 616–625, 679, 684; 222/1, 222/23, 40, 51, 52, 64–69
See application file for complete search history.

(56) References Cited

U.S. PATENT DOCUMENTS

| | | | |
|---|---|---|---|
| 456,667 A | 7/1891 | Adams | |
| 1,549,967 A | 8/1925 | Grindle | |
| 2,520,500 A | 8/1950 | Gray | |
| 2,935,582 A | 5/1960 | Northey | |
| 3,019,310 A | 6/1962 | Hoff | |
| 3,246,313 A | 4/1966 | Weaklend | |
| 3,253,745 A | 5/1966 | Skelton | |
| 3,697,708 A | 10/1972 | Beresic | |
| 3,771,549 A * | 11/1973 | Lemon et al. | 137/393 |
| 3,831,159 A | 8/1974 | Parsons | |
| 4,100,538 A * | 7/1978 | Knepler | 340/617 |
| 4,161,677 A | 7/1979 | Dill | |
| 4,807,672 A | 2/1989 | Sherk et al. | |
| 4,897,797 A * | 1/1990 | Free et al. | 700/266 |
| 5,339,854 A * | 8/1994 | Leith | 137/2 |
| 5,438,323 A * | 8/1995 | Shea | 340/620 |
| 5,532,673 A * | 7/1996 | Olson et al. | 340/450.2 |
| 7,012,536 B2 * | 3/2006 | McConnel et al. | 340/618 |
| 7,111,566 B2 | 9/2006 | Horn | |
| 2005/0035769 A1 * | 2/2005 | Otto et al. | 324/644 |
| 2006/0196884 A1 * | 9/2006 | Gerken | 222/64 |
| 2008/0120047 A1 * | 5/2008 | Jannotta | 702/55 |

* cited by examiner

*Primary Examiner*—Christopher J. Novosad
(74) *Attorney, Agent, or Firm*—Rebecca Henkel

(57) ABSTRACT

A fill tube and sensor assembly has a single electronic sensor to detect the level of product in a hopper of an agricultural implement relative to a fill line. The electronic sensor can be positioned at various heights relative to the fill tube to provide variability in the height of the fill line. The sensor provides a full level signal until product is drawn from the fill tube. Once the product is dispensed from the fill tube and into the general interior volume of the hopper, the single sensor provides an empty level signal that can be used to alert an operator of a diminished product supply or control operation of the farm implement.

7 Claims, 4 Drawing Sheets

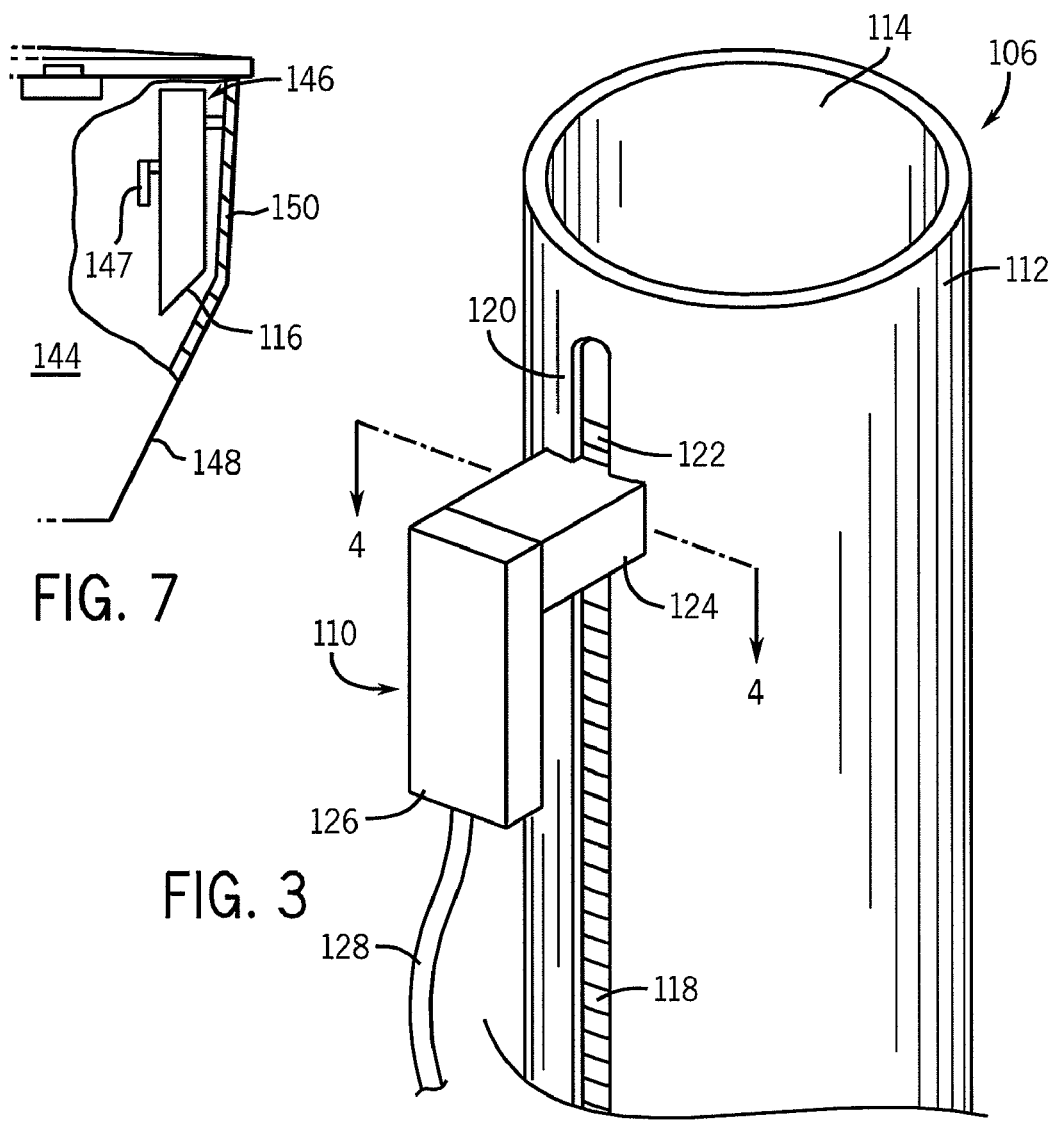
FIG. 3
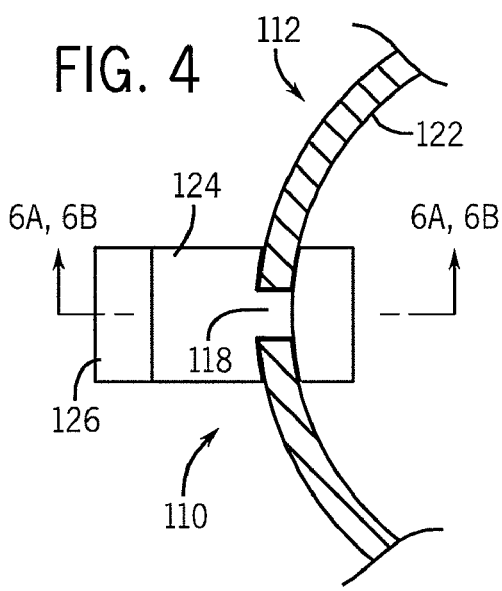
FIG. 7
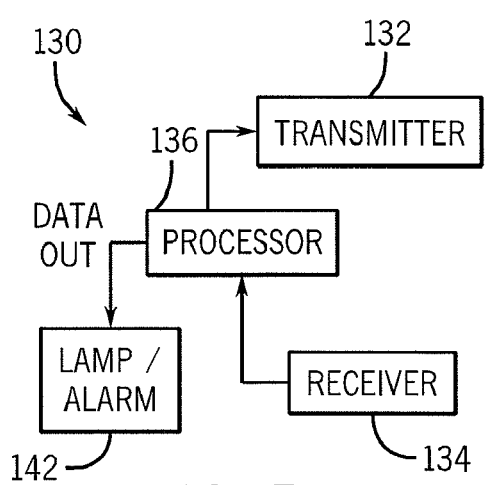
FIG. 4
FIG. 5

BIN LEVEL SENSOR FOR USE WITH A PRODUCT DISPENSING AGRICULTURAL IMPLEMENT

FIELD OF THE INVENTION

The present invention relates generally to agricultural implements, and in particular, to a product fill level sensor apparatus operative to detect the level of product in a product container or hopper of an agricultural implement.

BACKGROUND OF THE INVENTION

Seed and fertilizer planting farm implements typically have a seed and/or fertilizer storage container that is mounted to the farm implement. As the farm implement is traversed across a field, a product metering assembly dispenses product from the container along a seedbed in a metered fashion.

Generally, it is desirable to provide a product fill status to an operator regarding the fill level of product in the container. Typically, two separate sensors will be associated with the container. One sensor is mounted near the inlet of the container and the other sensor is mounted near the outlet of the container. The inlet sensor is used to determine when the container is full of product and the outlet sensor is used to determine when the container is empty of product. In this regard, conventional fill level detection systems have relied upon two separate sensors to provide separate full and empty signals.

SUMMARY OF THE INVENTION

The present invention is directed to a fill tube and sensor assembly in which a single electronic sensor, rather than two or more sensors, is used to detect the level of product in a hopper of an agricultural implement relative to a variable fill line. The sensor assembly includes an electronic sensor that can be positioned at various heights relative to the fill tube to provide variability in the height of the fill line. The fill tube is designed to be filled in a manner that is similar to the filling of the hopper as a whole, but product is not dispensed from the fill tube until the level of product in the hopper is lower than the discharge end of the fill tube. In this regard, a single sensor provides a full level signal until product is drawn from the fill tube. Once the product is dispensed from the fill tube and into the general interior volume of the hopper, the single sensor provides an empty level signal that can be used to alert an operator of a diminished product supply or control operation of the farm implement accordingly.

Therefore, in one aspect of the invention, a bin for use with an agricultural implement and configured to contain agricultural product that is to be selectively withdrawn as the agricultural implement traverse a field is disclosed. The bin includes a container having a first opening that allows product to be deposited into the container and a second opening that allows product to be withdrawn in a metered fashion from the container. A single electronic sensor provides a first signal when product within the container is above a predefined fill level and provides a second signal when product within the container is below the predefined fill level.

In accordance with another aspect, the present invention is directed to a farm implement that includes a feed tube for delivering product to a seedbed. A product container is operably associated with the feed tube and adapted to hold product to be dispensed through the feed tube. The farm implement includes a measuring gauge disposed in the product container at a height such that product does not fill the measuring gauge unless a product level in the product container exceeds the height. The farm implement further includes a sensor associated with the measuring gauge that outputs either a first signal indicating that product in the product container is above a predefined fill level or a second signal indicating that product in the product container is below the predefined fill level, wherein the predefined fill level is lower than the height.

According to yet a further aspect of the invention, a product container for use with a farm implement designed to dispense product is disclosed. The product container includes a hopper and a fill tube designed to be mounted to an interior wall of the hopper. The product container further includes a single sensor associated with the fill tube and adapted to provide a first signal when product in the fill tube is above a variable fill level and provide a second signal when product in the fill tube is below the variable fill level.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 3 is a partial isometric view of a fill tube and sensor assembly for use with the seed planting unit shown in FIG. 2;

FIG. 4 is a sectional view of the fill tube and sensor assembly of FIG. 3 taken along line 4-4 of FIG. 3;

FIG. 5 is a block diagram representation of an electronic fill level sensor incorporated into the sensor assembly shown in FIGS. 3-4;

FIG. 7 is a partial side elevation view of a product bin having an edge drain fill tube and sensory assembly according to another aspect of the invention.

DETAILED DESCRIPTION OF THE PREFERRED EMBODIMENTS

Figure 1:
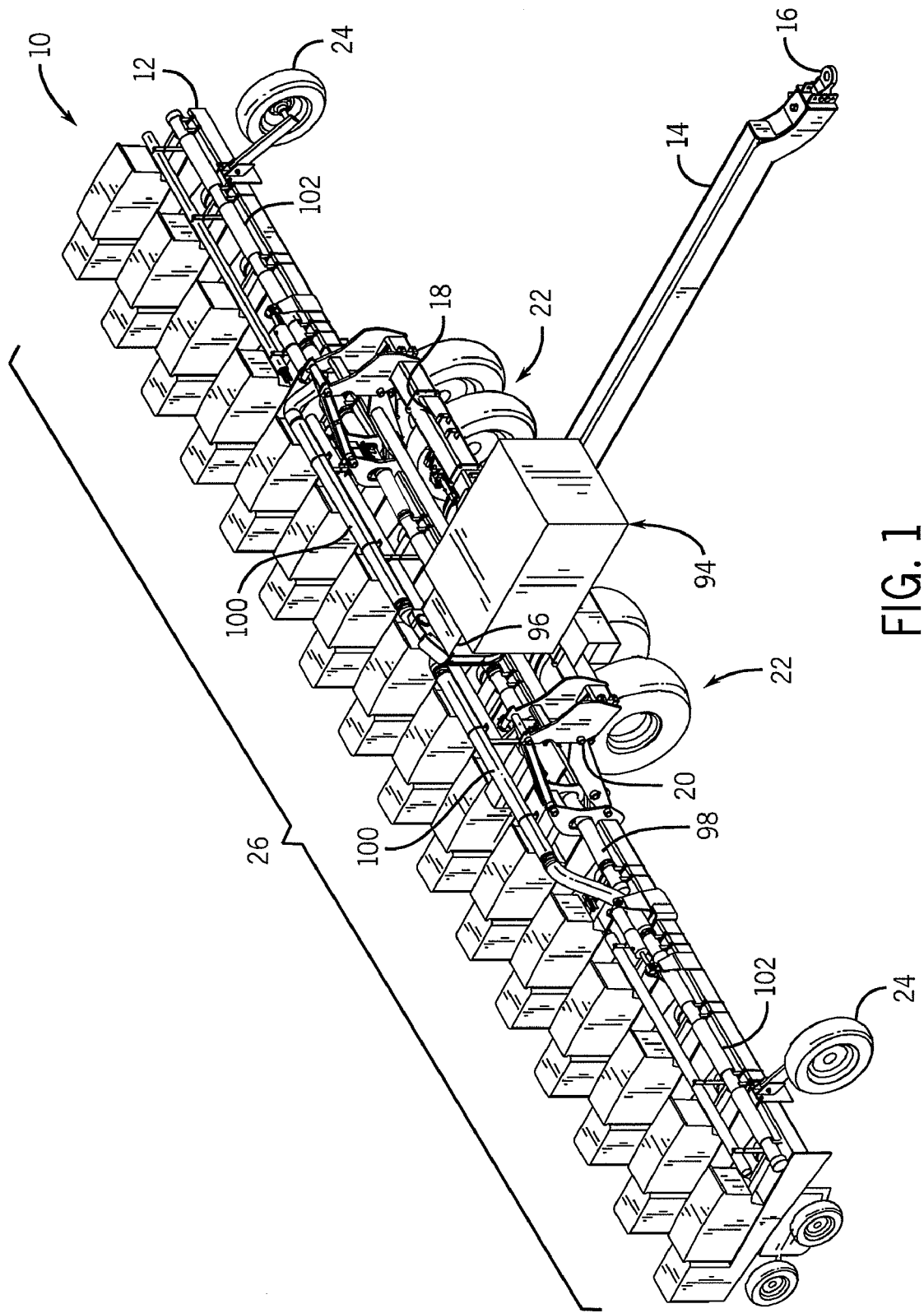
FIG. 1 is a schematic perspective view of a seed planting assembly supporting a plurality of seed planting units constructed in accordance with a preferred embodiment of the invention.

Referring to FIG. 1, a seed planting assembly 10 includes a laterally extending toolbar 12 connected at its middle (or other location) to a forwardly extending tow bar 14. Tow bar 14 includes a connector 16 disposed at its longitudinally forward end and configured to mate with a corresponding hitch, or the like, of a towing tractor (not shown). Toolbar 12 is supported by a chassis 18 that is connected to tow bar 14 via a hinged bracket assembly 20. Chassis 18 is supported on the ground by two pair of wheels 22. Outer portions of tool bar 12 are supported by outer wheels 24 having an adjustable height to thus control the height of the toolbar 12.

A plurality of seed planting units (or row units) 26 extends longitudinally rearwardly from toolbar 12. In particular, referring also to FIG. 2, each planting unit 26 includes a frame 28 that is connected at its front end 30 to toolbar 12 via a mounting assembly 32. Mounting assembly 32 includes a pair of upper support beams 34 (one illustrated) and a pair of lower support beams 36 (one illustrated) that are hingedly connected to frame or drill 28 at one end, and to a mounting structure 38 at another end. Mounting structure 38 is, in turn, connected to tool bar 12.

Frame 28 defines a front end 30 having a first pair of aligned apertures (not numbered) extending laterally therethrough. Corresponding apertures (not numbered) extend through the rearward ends 40 of each upper support beam 34. A pin 42 extends through each pair of aligned apertures, and is fastened to provide a joint 44 that enables planting unit 26 to pivot about mounting assembly 32.

Likewise, the front end 30 of frame 28 defines a second pair of laterally extending apertures (not shown) disposed below the first pair of apertures. The second pair of apertures is laterally aligned with corresponding apertures (not shown) extending laterally through the rearward ends 46 of each lower support beam 36. A pin 48 extends through each pair of aligned apertures and is fastened to provide a joint 50 that enables planting unit 26 to pivot about mounting assembly 32.

Each upper support beam 34 further defines a forward end 52 that defines corresponding apertures (not shown) extending laterally therethrough. Likewise, each lower support beam 36 defines a forward end 54 that defines apertures (not shown) extending laterally therethrough. Mounting structure 38 extends rearwardly from tool bar 12, and defines laterally extending apertures (not shown) that are aligned with the apertures extending through forward ends 52 and 54. Upper and lower pins 56 and 58 extend through the corresponding apertures and form corresponding joints 60 and 62 that pivotally connect the forward ends 52 and 54 of support beams 34 and 36 to mounting structure 38.

It should thus be appreciated that while the right-hand side of mounting assembly 32 (taken with respect to a view from rear-to-forward) is illustrated as being mounted onto the right-hand laterally outer walls of frame 28, the left-hand side of mounting assembly 32 is likewise mounted onto the left-hand laterally outer walls of frame 28 in a symmetrical and parallel manner with respect to the right-hand side of the mounting assembly. Accordingly, while the left support beams 34 and 36 are connected to the left side of planting unit 26 and mounting structure 38 such that both pairs of beams 34 and 36 are parallel to each other during operation.

As is well-known in the art, planting units 26 are mounted in a side-by-side (lateral) relation relative to each other along the toolbar 12. While sixteen such row units are illustrated in FIG. 1, the present invention contemplates that more or less than sixteen row units can be assembled on a single toolbar 12. During operation, forward movement of the tractor causes row units 26 to ride along the ground, forming a plurality of seed trenches into which product, such as seeds, is dispensed and are subsequently closed.

Referring again to FIG. 2, each planting unit 26 preferably includes a conventional seed trench opening assembly 64, each of which including a pair of laterally spaced seed trench opener discs 66 (also referred to as reels or coulters) that converge forwardly and downwardly to define a convergence point 68. A seed trench firming point 70 is disposed rearwardly from convergence point 68, and an opener shoe 72 is disposed rearwardly from seed trench firming point 70. Firming point 70 preferably extends slightly downwardly from the opener shoe 72, and firms the seed trench that is formed by convergence point 68. Firming point 70 and opener shoe 72 are preferably integrally connected. The depth of the seed trench can be controlled by a pair of gauge wheels (not shown) that are supported by gauge wheel arms 74 as understood by those having ordinary skill in the art. Alternatively, the planting unit 26 can be provided with a runner opener type for providing a seed trench in the ground as is appreciated by one having ordinary skill in the art. Planting unit 26 further includes a pair of seed trench closer discs 76 disposed rearwardly from opener shoe 72. A press wheel 78 is disposed rearwardly from closure discs 76.

A pair of screw and spring assemblies 80 (one shown) is displaced laterally from each other and extends downwardly from a first support member (not shown) extending laterally between the upper support beams 34 to a second support member (not shown) extending laterally between the lower support beams 36. Assemblies 80 are angled with respect to support beams 34 and 36, and can thus be actuated in a known manner to increase and decrease the down pressure exerted onto seed trench opening assembly 64 to control downward force on the opening discs 66, as is well understood by those having ordinary skill in the art. A knob 82 extends rearwardly from frame 28, and can be rotated to adjust the depth of gauge wheels (not shown) which control the desired seed trench depth as appreciated by one having ordinary skill in the art.

Planting unit 26 further includes a seed hopper 84 that provides storage for seed material that is to be gravitationally deposited into the seed trench that is formed as the seed trench opening assembly 64 moves across the field during operation. It should be appreciated, however, that a hopper container, smaller than container 84, can alternatively be connected to a centralized bin or large hopper in a conventional manner. In the illustrated embodiment, seeds are delivered from seed hopper 84 to a seed metering assembly 86 that acts under vacuum received by connector 88. The received seeds are then delivered into a seed tube 90 at a uniform rate. Seed tube 90 defines a conduit having an outlet end immediately downstream of firming point 70 and upstream of seed trench closer discs 76. Seed tube 90 thus receives seeds from metering assembly 86 and defines a substantially vertical passage through which the seeds are delivered through the opener shoe 72 and into the seed trench. The components of seed metering assembly 86 are further described in U.S. Pat. No. 6,109,193, the disclosure of which is hereby incorporated by reference. In a similar manner, seed hopper 84 may also be used to deposit fertilizer to the seed bed. Alternately, a separate hopper (not shown) containing fertilizer may be used.

During operation, as the tractor pulls the tool bar 12 across and over the ground, the seed trench opening assembly 64 opens a seed trench in the ground. Seeds from the hopper 84 flow into the seed metering assembly 86 in bulk and are subsequently deposited into the seed trench via seed delivery tube 90 at a controlled rate. The seed trench closer discs 76 trail the seed trench opening assembly 64 and, as the seed planting unit 26 is drawn across the field, close the seed trench together and over the seed dispensed by the seed metering assembly 86. The trailing press wheel 78 compacts the soil closed over the delivered seeds.

Planting unit 26 can also be equipped with a pesticide hopper 92 that is mounted towards a rear end of the planting unit. Hopper 92 preferably includes an insecticide and is provided with conventional dispensing apparatus for applying controlled amounts of insecticide where desired in combination with the planting of seeds by each planting unit 26.

Referring again to FIG. 1, each planting unit 26 can be coupled to an air moving system 94 that includes one or more air moving units (collectively identified as 96). While air mover unit(s) 96 is configured to provide negative pressure, they can alternatively function as blower units if a positive pressure seed metering assembly is implemented in planting units 26. Air moving system 94 includes a lower lateral tubing member 98 that is connected at its middle to one of the air moving units 96, and extends laterally outwardly therefrom in both directions. A plurality of openings (not shown) are formed in tubing member 98 that connect to a forward end of a corresponding plurality of flexible intake tubes that, in turn, connect with the corresponding metering assembly connector 88.

A bifurcated arrangement is illustrated with respect to a pair of upper lateral tubing members 100 that are connected at their laterally inner ends to one or more air mover units 96. Tubing members 100 extend parallel to, and are disposed above, tubing member 98, and are connected at their outer ends to outer tubing members 102. Outer tubing members 102 are vertically aligned with lower tubing member 98, and extend across those planting units 26 that are disposed laterally outwardly with respect to lower tubing member 98. A plurality of openings (not shown) are formed in tubing members 102 that connect to a plurality of flexible intake tubes that, in turn, connect with the corresponding metering assembly connectors 88 of laterally outwardly disposed planting units 26.

During operation, air moving units 96 draw air through the metering assemblies 86 of all planting units 26 to which the lateral tubes 98 and 102 are operably connected. The number of air mover units 96 implemented in a given seed planting assembly depends largely on the number of planting units 26 and the airflow rating of each air mover unit.

The present invention recognizes that certain seed types (for example, soybeans) are well suited to be planted in seed trenches that are laterally spaced a distance equal to the distance between adjacent seed trench opening assemblies 64 of all planting units 26 disposed on tool bar 12. However, in order to accommodate other seed types (for example, corn) that require additional distance between adjacent seed trenches in order to grow properly, it is necessary, from time to time, to raise certain planting units 26 above the ground 104.

It should thus be appreciated that the term "raised position" as used in the present application refers to a position whereby planting unit 26 has been translated upwardly to a height sufficient to cause at least the corresponding seed trench opening assembly 64 (and preferably closer disc 76 and press wheel 78) to become suspended above the ground 104. Accordingly, raised planting units 26 will not form a seed trench in the ground 104 when the seed planting assembly 10 is driven across the ground 104. In one preferred embodiment, alternating planting units can be raised from the ground 104, thereby doubling the distance between adjacent seed trenches compared to the distance that is achieved when all planting units are engaged, such as described in U.S. Pat. No. 7,111,566, the disclosure of which is incorporated herein. Additionally, each planting unit 26 may include a vertical positioner assembly and associated linkages such as described in U.S. Pat. No. 7,111,566 to raise and lower the planting unit.

Referring again to FIG. 2 and further reference to FIG. 3, hopper 84 includes a center drain fill tube 106 adapted to provide product fill level information. More particularly, the fill tube 106 is designed to be mounted to an interior wall 108 of the hopper 84 and includes a single electronic sensor assembly 110 that monitors the level of product within the hopper 84 relative to a single fill level. Alternately, the fill tube 106 may be integrally formed with wall 108. When the product in the fill tube 106 is above the fill level, a suitable signal is provided and, conversely, when product in the fill tube 106 is below the fill level, a suitable signal is provided. In a preferred embodiment, the height of the electronic sensor assembly 110 is set such that when product falls below the fill level, an operator will know that it is time to refill the hopper 84 or be able to assess how much product is available for dispensing until the hopper 84 becomes empty.

The fill tube 106 has a generally cylindrical shaped housing 112 providing an open fill (inlet) end 114 and an open discharge (outlet) end 116. In one embodiment, the open discharge end 116 is slightly angled toward the interior of the hopper 84. Thus, when product is loaded into the hopper 84, product will also be loaded into the fill tube 106. As product is dispensed from the bottom of the hopper 84, the level of product within the hopper 84 will decrease. More particularly, as product is dispensed, the volume in the hopper 84 previously occupied by the dispensed product will be filled as product falls by gravity from higher levels in the hopper 84. When the level of product in the hopper 84 falls below the discharge end 116, the level of product in the fill tube 106 will be drawn down. When the level of product in the fill tube 106 falls below a defined fill level, the fill level sensor assembly 110 provides an output signal that can be used to signal the operator that the fill level in the hopper 84 is below that fill level, e.g. empty. For example, the output signal can be used to illuminate an indicator light (not shown) in the operator cab of the farm implement 10, sound an audible alarm, or both.

In this regard, as product drains from the center of the hopper 84 first, the larger body of product material is generally undisturbed within the hopper. As the fill level in the hopper 84 approaches empty, there may be some drawdown of product within the fill tube 106. As the product level in the hopper 84 further approaches empty, a gap will eventually occur between the discharge end of the fill tube 106 and the fill level within the hopper 84. As the level of product in the fill tube 106 is higher than that in the hopper 84, product will drain relatively quickly from the fill tube 106. Once the product level in the tube 106 drops below the fill level, a corresponding signal is provided. In this regard, the fill tube 106 has a cross-sectional area of the fill tube 106 is large enough to allow product to pass freely once the product level in the hopper 84 drops below the discharge end of the fill tube 106.

Referring now to FIG. 3, a vertically oriented slot 118 is formed in the housing 112 and defines a path along which the electronic sensory assembly 110 may be variably positioned. Thus, in one embodiment, an operator may position the electronic sensor assembly 110 at a desired height relative to the fill tube housing 112 by incrementing the electronic sensor assembly 110 within the slot 118.

The sensor assembly 110 is coupled to a mounting assembly 120 that permits the sensor assembly 110 to be variably positioned within slot 118. In one embodiment, the mounting assembly 120 includes a series of plates 122 mounted to the interior surface of the housing 112 and designed to bypass one another as the sensor assembly 110 is repositioned within the slot 118. The plates 122 are mounted to the interior surface of the housing 112 in a manner that allows the sensor assembly 110 to be positioned at various elevations along the slot 118 without requiring a separate locking or similar device to secure the sensor assembly 110 at a given elevation. Moreover, the plates 11 and the sensor assembly 110 collectively keep the slot 118 closed regardless of the position of the sensor assembly 110. As such, product is kept from falling out of the fill tube housing 112 through the slot 118.

The sensor assembly 110 includes a sensory circuitry (FIG. 5) contained within a sensor housing 124, that as shown in FIG. 4, extends partially into the interior of the fill tube 106. The sensor housing 124 is coupled to a handle 126 to allow an operator to manually slide the sensor assembly 110 along slot 118 to a desired position. A cable 128 extends from the handle 126 and includes a power lead (not shown) electrically connected to the sensor circuitry to provide power to the sensor circuitry. Additionally, the cable 128 may include control and data wires (not shown) to communicate control commands to the sensor circuitry and readout data. Alternately, wireless communication and data transfer techniques and associated hardware/software could be used for sensor control and data transfer.

Figure 6A:
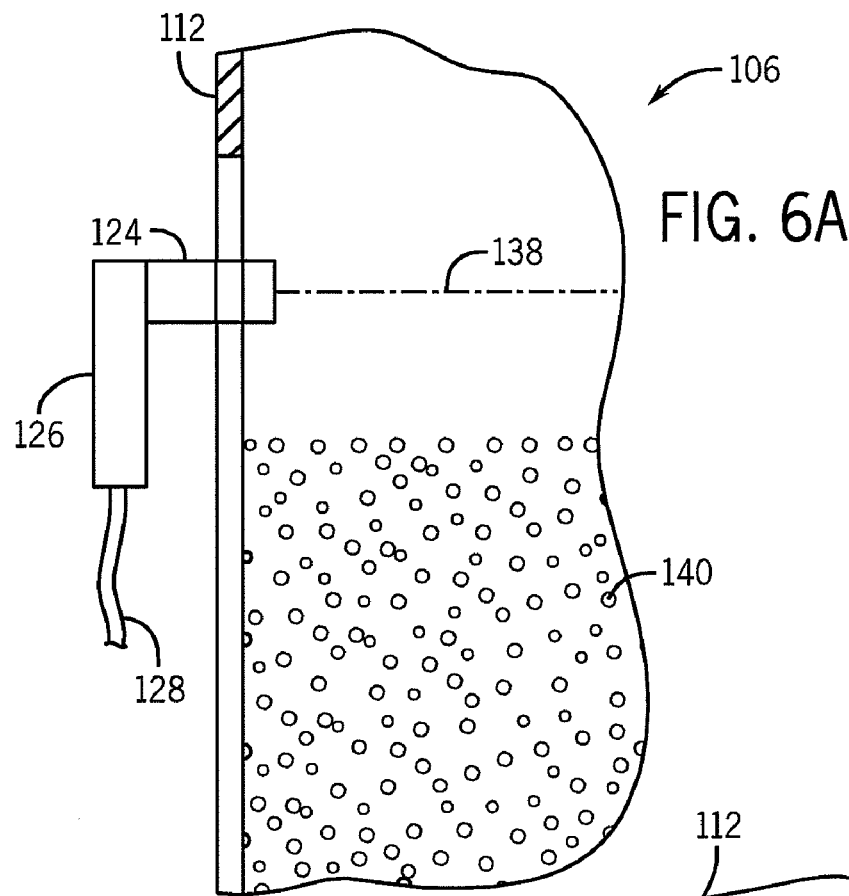
FIG. 6A is a sectional view of the fill tube and sensor assembly taken along line 6A-6A of FIG. 4 with the level of product in the fill tube below a given fill line.
Figure 6B:
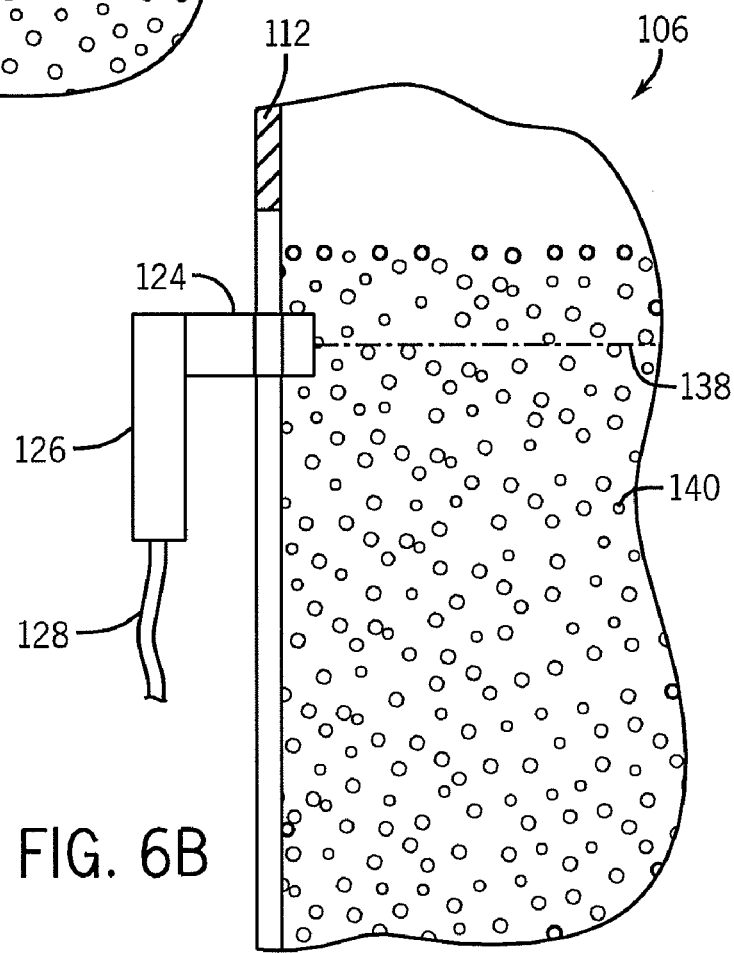
FIG. 6B is a sectional view of the fill tube and sensor assembly taken along line 6B-6B of FIG. 4 with the level of product in the fill tube above the given fill line.

In one preferred embodiment, and referring now to FIG. 5, the sensory circuitry 130 generally includes a transmitter 132 and a receiver 134 both communicatively coupled to a processor 136 or similar control device. With further reference to FIGS. 6A-6B, under the control of the processor 136, the transmitter 132 is caused to transmit an infrared signal, for example, within the interior of the fill tube 106 along a fill line 138. The receiver 134 detects the infrared signal, as reflected by the contents within the fill tube 106, if any. The processor 136 compares the intensity of the emitted signal to the intensity of the received signal to determine if the level of product in the fill tube 106 is above or below the fill line 138.

For example, the processor 136 may control the transmitter 132 to emit an infrared signal at a given signal strength along the fill line 138. If the level of product 140 in the fill tube 106 is at or above the fill line, such as in FIG. 6B, a portion of the infrared signal will be absorbed by the product 140 and not reflected back toward the receiver 134. Since there is a significant difference in the intensities of the two signals, the processor 136 will output a signal indicating that product 140 in the fill tube 106 and thus the hopper 84 as a whole is above the given fill line 138. In one embodiment, an indicator lamp 142 proximate the operator cab of the farm implement is suitably activated to indicate that the product level is above the fill line. For instance, the lamp 142 may include a green LED that is energized when the product level is at or above the fill line.

On the other hand, if the level of product in the fill tube 106 is below the fill line 138, such as in FIG. 6A, then the intensity of the received infrared signal will be similar to that of the emitted infrared signal as the signal will be reflected back by the interior surfaces of the fill tube housing 112. The processor 136 may provide a suitable "low product level" signal to the lamp 142 or sound an alarm. For instance, the lamp 142 may include a yellow or red LED that is activated in response to the low product level signal.

In a preferred embodiment, the sensor is positioned at the discharge end of the tube so that an empty signal is provided when the product is completely drawn from the fill tube; however, it is understood that the sensor could be positioned at other levels, thereby charging the position at which an "empty" signal is provided.

Figure 2:
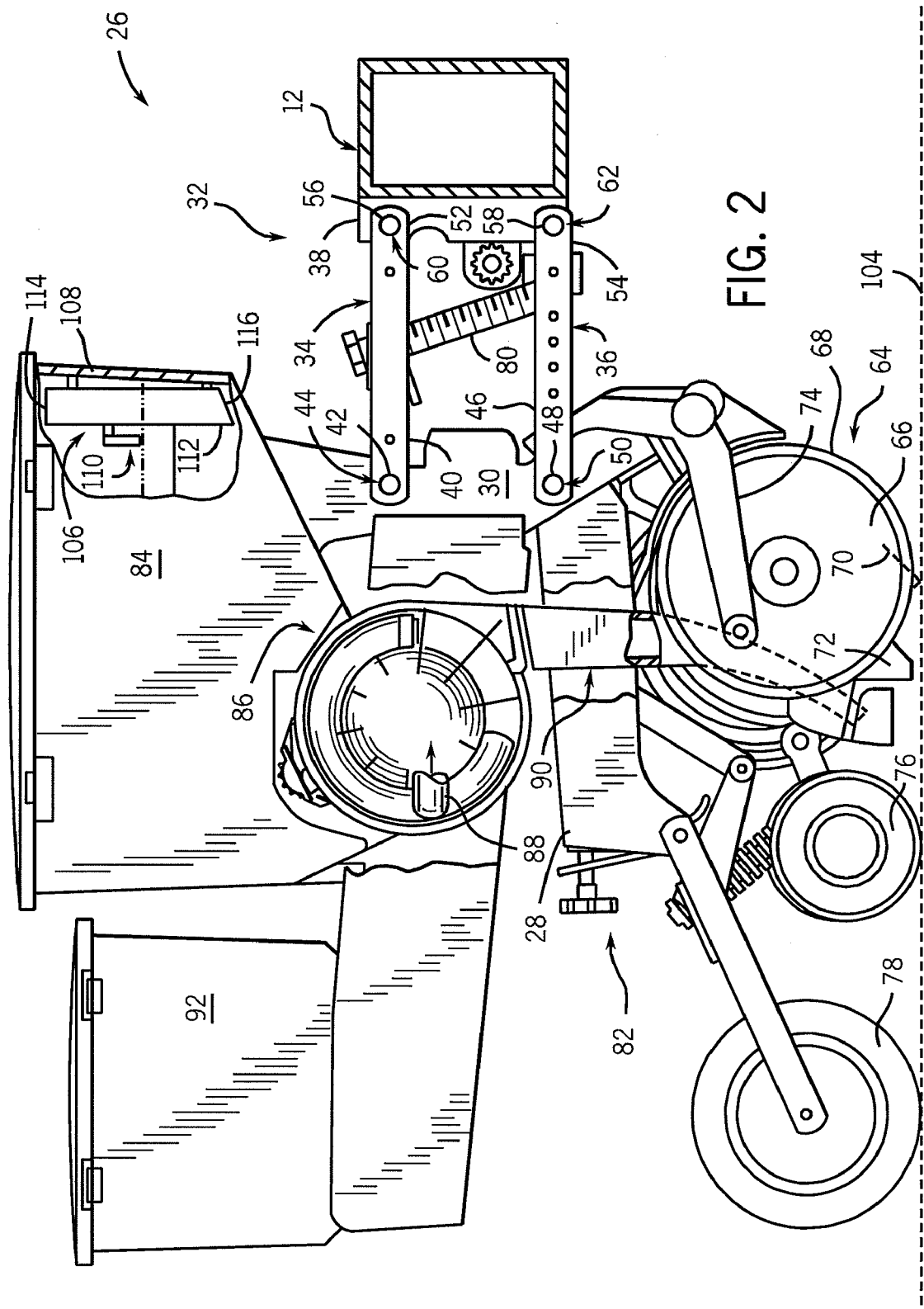
FIG. 2 is a side elevation view of a seed planting unit illustrated in FIG. 1 with a center drain fill tube and sensor assembly.

Referring now to FIG. 7, a portion of a hopper 144 having an edge drain fill tube 146 with a fill level sensor 147 is shown in accordance with an alternate embodiment of the present invention. In this configuration, the discharge wall 148 of the hopper 144 is much steeper than that of the hopper 84 shown in FIG. 2. The fill tube 146 is secured to an interior wall 150 of the hopper 144. In this type of hopper 144, product moves down in a more even manner across the diameter of the hopper compared to hoppers with a flatter drain wall, such as illustrated in FIG. 2. Thus, product will drain from the fill tube 146 in an incremental fashion similar to the incremental drawdown from the hopper 144 as a whole until the level of product level drops below the discharge end of the fill tube. Once that occurs, product will dispense from the fill tube 146 relatively quickly.

It is recognized that other types of sensors other than infrared sensors may be used, such as ultrasonic sensors, for example. Additionally, it is recognized that the fill tube could be constructed of multiple linear sections that can be retracted or extended to vary the overall length of the fill tube. It is also contemplated that tubes of different diameters could be used to account for different sized product material.

It will be appreciated that the length of the fill tubes described herein may be matched to the depth of the hopper. In this regard, in one embodiment, the length of the fill tube is adjustable so that the same fill tube can be used for deeper as well as shallower hoppers.

Many changes and modifications could be made to the invention without departing from the spirit thereof. The scope of these changes will become apparent from the appended claims.

We claim:

1. A bin for use with an agricultural implement and configured to contain agricultural product that is to be selectively withdrawn as the agricultural implement traverse a field, the bin comprising:
    a container having a first opening to allow product to be deposited into the container and a second opening to allow product to be withdrawn in a metered fashion from the container;
    a vertically oriented slot formed on said container;
    a single electronic sensor that provides a first signal when product within the container is above a predefined fill level and provides a second signal when product within the container is below the predefined fill level;
    a fill tube disposed within the container and wherein the fill tube is adapted to contain product at a level substantially equal to that of the container and wherein the single electronic sensor is operatively associated with the fill tube;
    wherein said vertically oriented slot defines a path for said sensor to be variably positioned; said sensor is coupled to a mounting assembly; wherein the sensor can be variably positioned with the slot;
    said mounting assembly includes a series of plates mounted to the interior surface of the container;
    a handle connected to the single electronic sensor and operative to allow a user to adjust a position of the single electronic sensor relative to the fill tube along said slot;
    wherein the tube has a hollow body defined by a first end through which product is received and a second end through which product is dispensed, and wherein the second end has a discharge surface that is slanted toward a center of the container.

2. The bin of claim 1 wherein the single electronic sensor is an infrared sensor that emits an infrared beam in a beam path along the predefined fill level and provides the first signal when the infrared beam is interrupted by product in the beam path and provides the second signal when the infrared beam is not interrupted by product in the beam path.

3. The bin of claim 1 wherein the container is adapted to hold at least one of fertilizer and seed.

4. The bin of claim 1 wherein the second opening is adapted to communicate with a feed tube of the agricultural implement.

5. A farm implement comprising:

a feed tube for delivering product to a seedbed;

a product container operably associated with the feed tube and adapted to hold product to be metered by the feed tube;

a measuring gauge disposed in the product container at a height such that product does not fill the measuring gauge unless a product level in the product container exceeds the height; and a sensor associated with the measuring gauge that outputs either a first signal indicating that product in the product container is above a predefined fill level or a second signal indicating that product in the product container is below the predefined fill level, wherein the predefined fill level is lower than the height;

wherein the tube has a hollow body defined by a first end through which product is received and a second end through which product is dispensed, and wherein the second end has a discharge surface that is slanted toward a center of the container;

wherein the product container has a sidewall with a slot formed in the slot and wherein the measuring gauge has a mounting carriage that is associated with the slot in a manner that allows the measuring gauge to be positioned at a desired elevation by moving the carriage in the slot;

wherein the measuring gauge has a product discharge end and the sensor is connected to the measuring gauge proximate the product discharge end;

wherein the measuring gauge has a generally tubular body having a generally flat product intake and an angled product discharge end.

6. The farm implement of claim 5 wherein the product container is adapted to hold seed or fertilizer.

7. A product container for use with a farm implement designed to dispense product, the product container comprising:

a hopper;

a fill tube designed to be within and mounted to the hopper; and a single sensor associated with the fill tube and adapted to provide a first signal when product in the hopper is above a variable fill level and provide a second signal when product in the hopper is below the variable fill level;

wherein the fill tube has an exterior wall and a slot formed in the exterior wall and the single sensor has a handle extending through the slot to an exterior of the fill tube;

wherein the handle is moveable vertically along the slot to set a height of the single sensor;

wherein the single sensor emits a single beam along a desired fill line.

* * * * *